United States Patent
Rauls

[15] 3,707,301
[45] Dec. 26, 1972

[54] ADJUSTABLE ADAPTER

[72] Inventor: James M. Rauls, 11642 Eudora Lane, Garden Grove, Calif. 92640

[22] Filed: June 3, 1970

[21] Appl. No.: 43,098

[52] U.S. Cl. ..........................285/9 R, 285/8
[51] Int. Cl. ...................................F16l 25/00
[58] Field of Search......285/8, 9, 338, 347, 109, 107; 128/351, 242–245; 279/2

[56] References Cited

UNITED STATES PATENTS

| | | | |
|---|---|---|---|
| 291,282 | 1/1884 | Blue | 279/2 |
| 2,071,780 | 2/1937 | Aghnides | 285/8 |
| 2,912,982 | 11/1959 | Barsky | 128/351 |
| 3,154,079 | 10/1964 | McKay | 128/348 |
| 3,169,529 | 2/1965 | Koenig | 128/351 |
| 3,388,705 | 6/1968 | Grosshandler | 285/226 |

*Primary Examiner*—Andrew V. Kundrat
*Attorney*—Robert G. Rogers

[57] ABSTRACT

The device includes an expandable cone section which adjusts into conformation with the inner diameter of a tube being coupled by the device to another tube. The cone section is expanded by the engagement of the other tube in the open end of the device.

8 Claims, 6 Drawing Figures

PATENTED DEC 26 1972 3,707,301

INVENTORS
JAMES M. RAULS

BY Robert G. Rogers

ATTORNEY

PATENTED DEC 26 1972
3,707,301
2 Sheets-Sheet 2
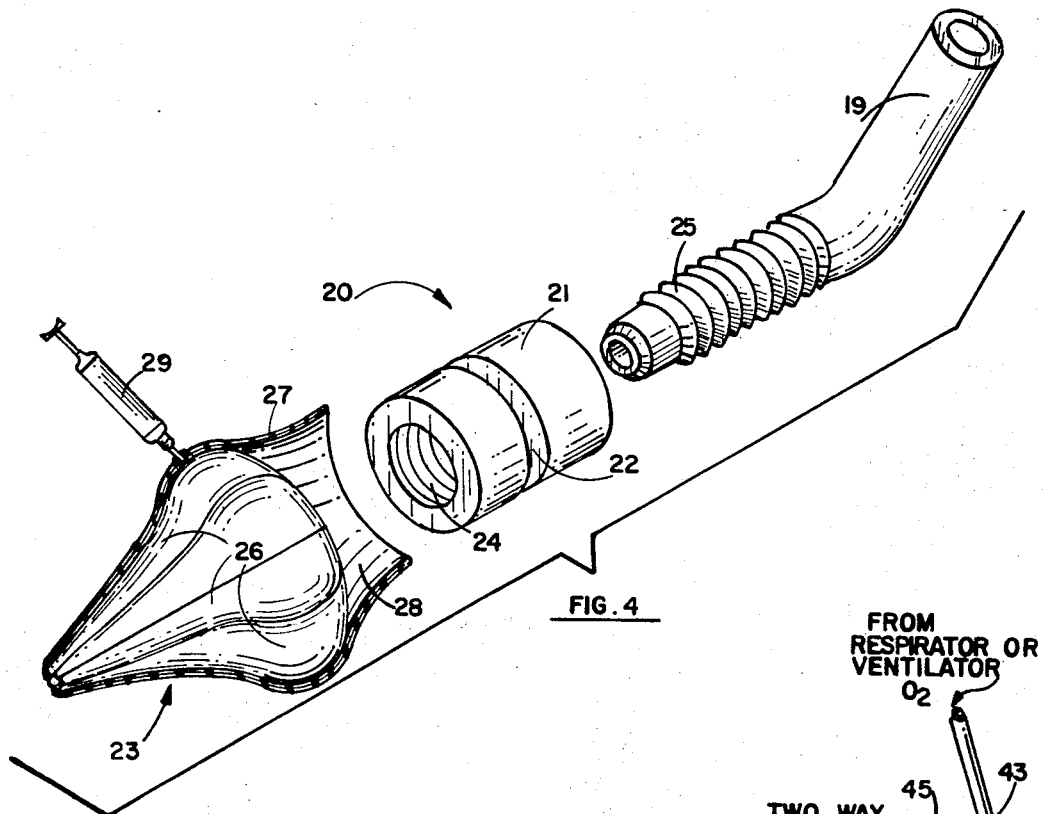
FIG. 4
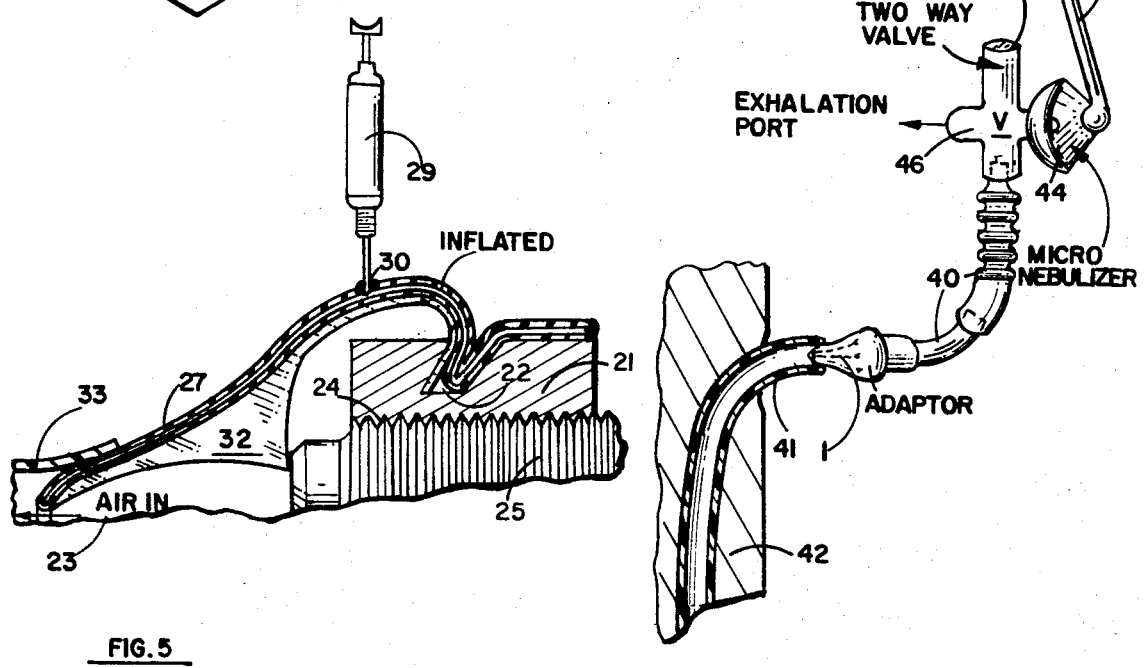
FIG. 5
FIG. 6
INVENTORS
JAMES M. RAULS
BY Robert G. Rogers
ATTORNEY

3,707,301

ADJUSTABLE ADAPTER

BACKGROUND OF THE INVENTION

1. Field of the Invention

The invention relates to an adjustable adapter for tubes and, more particularly, to such a device including a cone section that has an adjustable perimeter for enabling it to adapt, or couple, tubes of one diameter to tubes of another diameter as a function of the degree of engagement of one tube in the open-end section of the device.

2. Description of Prior Art

The present invention is directed towards the problem of coupling one tube to other tubes with diameters which are ordinarily determined at the time of coupling. In other words, the diameter of one tube must be adapted to the diameter of another tube by a coupling device.

The problem is most acute in the field of inhalation therapy, where the trachea of different patients have different diameters. As a result, the tubes which are inserted into the trachea also have different diameters. The tubes carrying oxygen to the trachea tubes generally have a standard diameter. Therefore, in order to couple the tubes together, an adapter must be used. Ordinarily, a therapist picks and chooses from several cone-shaped adapters until an adapter having the proper size relative to the trachea tube is selected. In the process, time is consumed and the patient does not receive the oxygen he needs.

An adapter is needed which can be adjusted to fit tracheotomy tubes. An adjustable adapter would substantially reduce the time required to couple oxygen to a patient.

However, although the problem of inhalation therapy offers the greatest need for an improved coupling device, the problem is not limited to that field. An adjustable, or conformable, coupling device may be effectively used in a lab, and in other areas where tubes must be interconnected quickly and efficiently.

SUMMARY OF THE INVENTION

Briefly, the invention comprises an adjustable adapter for coupling tubes together. The adapter includes an adjustable cone section which inserts into a tube. A second tube is inserted into an open-end section of the adapter and forces the cone section to expand until the adapter is securely engaged within the first tube. In other words, the diameter of one tube is adapted to the diameter of the second tube by use of the adjustable adapter.

In one embodiment, the cone section comprises flexible fingers which are enclosed by an elastic sheath. The other end of the adapter is open and includes a threaded inner channel which mates with the threaded outer diameter of a tube which is being adapted, or coupled, to another tube. As the threaded tube is engaged in the channel of the device, it contacts a protruding lever which is connected to the flexible fingers. The fingers are forced apart as the tube is inserted inside the adapter. When the adapter is secured within the other tube, the engaging process is discontinued.

In order to prevent leakage from between the fingers, the open space must be sealed. In one embodiment, the entire cone section is covered by the elastic sheath. In other embodiments, the fingers may be molded as part of an elastic cone section.

The adapter can be used to couple tubes having diameters as small as the unflexed cone section and as large as the diameter of the cone section when the fingers are completely flexed. The maximum and minimum diameters can be changed by changing the size of the cone section.

Although, in the preferred embodiment, the open-end section of the adapter is threaded to mate with the threaded outer diameter of a tube having a standard diameter, in other embodiments, threaded sleeves having different diameters can be used. In that case, the threaded sleeve would be disconnectable from the cone section. In addition, connectors other than threaded connectors can also be used.

Therefore, it is an object of this invention to provide an improved adjustable adapter for coupling tubes of different diameters together.

It is another object of this invention to provide an improved coupling device including a section which adjusts into conformation to the inner diameter of one tube being coupled to another tube.

It is another object of the invention to provide an improved and adjustable adapter having flexible fingers which can be forced open to securely engage the inner diameter of a tube being coupled to another tube.

A still further object of the invention is to provide an improved adjustable adapter usable in inhalation therapy to reduce the time and effort required to couple an oxygen supply tube to a tracheotomy tube.

A still further object of the invention is to provide an adjustable adapter device used to couple tubes of one diameter to tubes which have a diameter that is ordinarily not determinable until the time required to couple them together.

A still further object of the invention is to provide an adjustable adapter which has flexible fingers including an elastic cover for sealing the space between the fingers when the fingers are flexed.

Another object of the invention is to provide an improved adjustable adapter in which the cone section of the device expands and contracts into engagement with the inner diameter of one tube as a function of the degree of engagement of a second tube in the open-end section of the adapter.

Another object of this invention is to provide an adjustable adapter for coupling tubes together and which uses an inflatable outer sheath for preventing leakage from the adapter and for maintaining a secure engagement of the adapter in a tube.

These and other objects of the invention will become more apparent when taken in connection with the description of the drawings, a brief description of which follows.

BRIEF DESCRIPTION OF DRAWINGS

FIG. 4 is an exploded view of a different embodiment of the invention showing an inflatable outer sheath and a pump for inflating the sheath.

FIG. 5 is a partial cross section of an embodiment of the invention showing the inflatable sheath in a partially inflated position.

FIG. 6 is a system embodiment of the invention showing how the device adapts tubes of one diameter to tubes of different diameters.

DESCRIPTION OF PREFERRED EMBODIMENT

Figure 1:
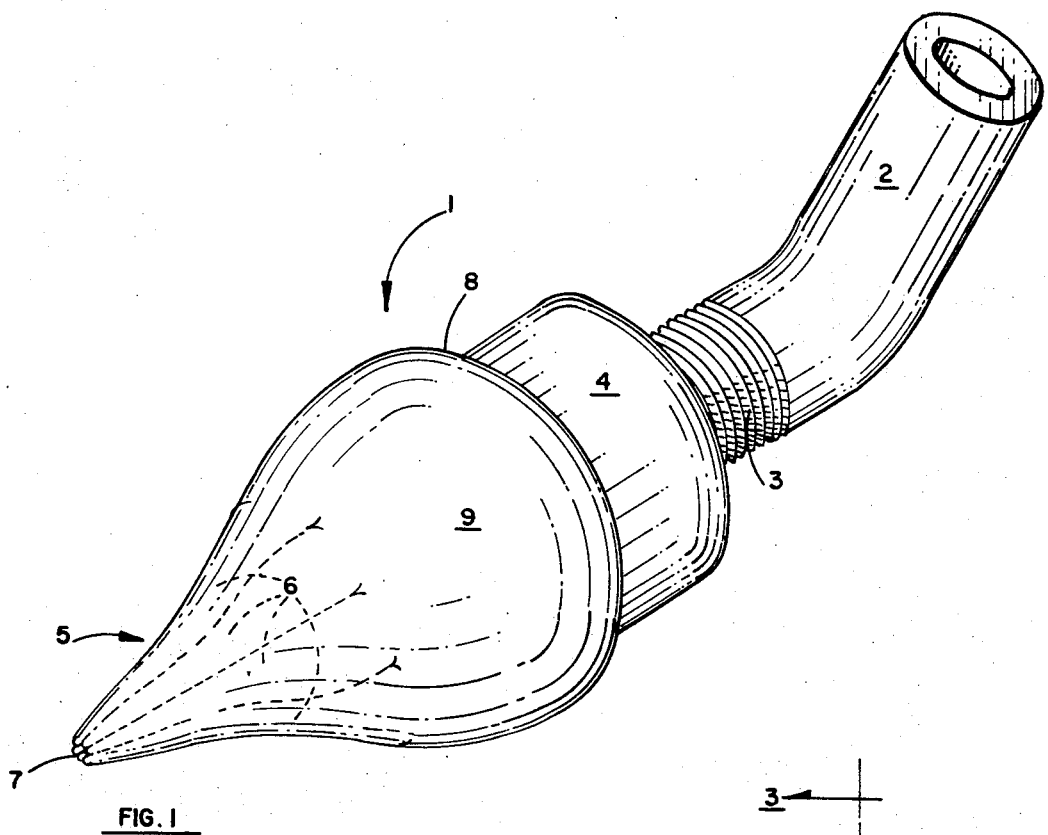
FIG. 1 is a perspective view of one embodiment of the adjustable adapter showing the flexible fingers of the cone section in an unflexed position.

FIG. 1 is a perspective view of the adjustable adapter 1 and tube 2 including a threaded termination 3 which engages the open-end section 4 of the adapter. The open-end section 4 also includes a threaded inner channel for mating with the threaded termination 3 as can be seen more clearly in FIG. 3. Cone section 5 of the adapter is inserted into another tube (see FIG. 6) and its diameter is adjusted for coupling tube 2 to the other tube.

The cone section 5 is comprised of a plurality of flexible fingers, or arms, 6 which terminate at the tip 7 of the cone section. The fingers are shown in their unflexed position.

The adapter can be used to couple tubes having a diameter no smaller than the diameter of the cone section 5 when the fingers are in their unflexed position. The maximum diameter of tubes that the adapter can couple to other tubes is determined by the diameter of the cone section when the fingers are flexed outwardly to their most extreme position. For the embodiment shown, the maximum diameter is roughly the diameter of the cone section approximately halfway between the tip 7 and the outer rim, or shoulder, 8 of the adapter 1. In other embodiments, the cone section can be cut or formed in such a way that the base of the fingers extends all the way to the rim 8. As a result, the device can be used to couple tubes having a larger maximum diameter.

The cone section 5 includes a cover 9 which seals the space between the fingers 6 when the fingers are flexed outwardly. In one embodiment, the cover 9 may be implemented by a rubber, or other elastic, material. In one embodiment, the cover may be comprised of a cone-shaped sheath which is stretched over a cone-shaped plastic member cut with the finger configuration shown in FIG. 1.

Figure 2:
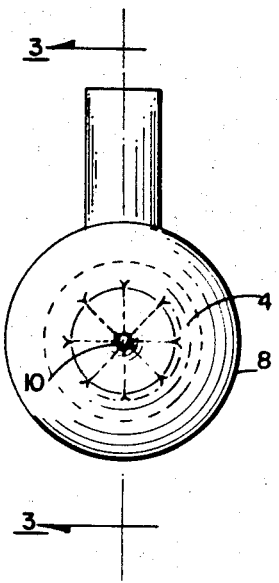
FIG. 2 is a front view of the adjustable adapter showing the fingers in an unflexed position and showing the orifice of the cone section.

FIG. 2 is a front view of the adapter 1 showing orifice 10 at the tip 7 of front section 5. Tube 2 is also visible at the rear of the adapter 1. The base of fingers 6 is shown at approximately the midpoint of the cone section. The fingers are shown in their unflexed position. The outer circumference of open-end section 4 is shown by a dotted line. The size of the rim 8 relative to the outer circumference of open-end section 4 can be clearly seen.

Figure 3:
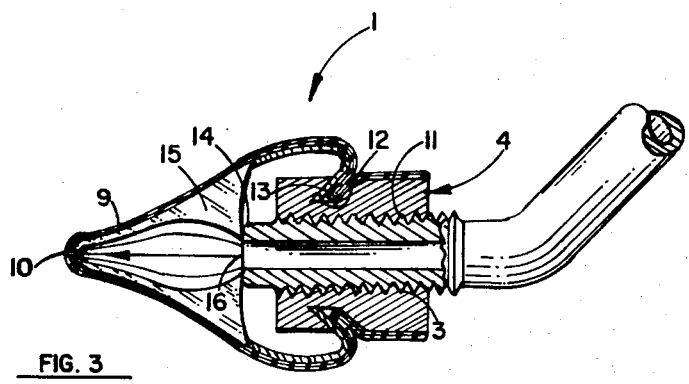
FIG. 3 is a crosssectional view of the FIG. 2 embodiment showing the sleeve with its threaded inner channel and the internal lever structure for controlling the position of the fingers.

FIG. 3 is a cross section of the FIG. 2 embodiment taken along line 3—3. The inner structure of the adapter 1 is shown. The threaded end 3 of tube 2 is engaged in the threaded inner channel 11 of the open-end section 4. Tube 2 is hollow for permitting fluids to flow from the tube through the adapter.

The open-end section 4 is in a circular sleeve configuration which can be produced in one embodiment by molding a plastic material into the configuration shown. The diameter of the threaded inner channel corresponds to the diameter of the tubes expected to be adapted to other tubes. In other words, assuming that tube 2 has a standard diameter, the channel 11 would be formed with that standard diameter. In that way, tubes of standard dimensions could be easily adapted to tubes whose dimensions may vary depending on the particular application involved.

Slot, or groove, 12 is formed in the outer circumference of the sleeve portion. For the FIG. 3 embodiment, the slot slants inwardly towards the cone section and has a width sufficient to accommodate the inwardly slanted and tensioned end member 13 of the cone section 5. The inward slant and downward tension of the end member prevents the cone section 5 from becoming easily disengaged from the slot. The slant of the end member 13 also facilitates the assembly of the cone section 5 to the open-end section 4. The open-end section can be easily pushed into position in the opening existing at the base of the cone section surrounded by the circumferentially disposed member 13.

The cone section 4 and the open end at section 5 are sealed by cover 9 described in connection with FIG. 1. The cover may be a cone-shaped rubber sheath that is pulled over the adapter after it has been assembled.

In other embodiments, the sheath need not extend over the open-end section 4. It is sufficient if the sheath covers the finger section. However, as a practical matter, the sheath should extend over the rim 8 so that it does not slip off easily when the adapter is being used.

Slot 12 is wide enough to accommodate both the end member 12 and the thickness of the rubber sheath. If preferred, the sheath can be forced into the slot to insure that it does not slip off the adapter during an operation. As indicated above, the sheath prevents leakage from occurring between the fingers 6 of the adapter 1 when the fingers are outwardly flexed.

The fingers are outwardly flexed by the force of end 14 of the tube 2 against the back surface of wedge-shaped lever 15. The lever 15 is formed about the inner circumference of cone section 5 and is integrally connected to the fingers 6 of the tip.

Opening 16 is provided at the center of the cone section for mating with the opening in the center of the tube 2. The openings enable a fluid, such as oxygen, to flow from the tube through the adapter 1 and out orifice 10. A workable embodiment of the invention is shown in FIG. 6.

The diameter of the cone section is controlled by the engagement of the threaded end 3 in the threaded inner channel 11. When the end 14 of the tube 2 is forced against lever 15, a force is developed to flex the fingers outward. The degree of flexure depends on the position of the threaded end member in the channel 11.

The sleeve must be formed to accommodate all the threads of a tube 2 in such a way that when the threaded end 3 is completely inserted in the threaded inner channel 11, the fingers are flexed to their maximum position. Although the FIG. 3 embodiment shows a space between the end of the sleeve and the face of member 15, in other embodiments, the sleeve may be in slight contact with the member 15. As a practical matter, however, it is preferred to have some space between the sleeve and the member 15.

In operation, the tip 5 is pushed inside a tube to adapt the diameter of, for example, tube 2 to another tube into which the cone section has been inserted. The tube 2, or other standard tube, is engaged within the sleeve 11 until the adapter is secured within the other tube. At that time, the disengaging process is discontinued.

Although FIG. 3 illustrates one embodiment of the adapter and, therefore, one method of assembling an adapter, other embodiments are also possible. For example, the slanted member 13 and slot 12 need not be in the configuration shown. The end 13 could be in the form of a clip that snaps in to a mating groove in the outer circumference of the sleeve.

In addition, although the FIG. 3 embodiment shows threads on the sleeve and on the tube 2, locking pins could also be used. The only consideration is that the end of tube 2 be secured within the end of adapter 1 in such a manner as to force the fingers of the cone section to an outward position depending on a particular application. However, it should be made clear that a separate member could be used to force the finger to a flexed position. The use of the adapting tube is one convenient embodiment.

Similarly, although the FIG. 3 embodiment is comprised of a cone section and an open-end section covered by a sheath, in other embodiments, the pieces may be molded as one integral unit. The complete assembly may be formed by molding rubber into the configuration shown or the cone and open-end member could be molded together. Although a removable sheath could be used, the unit could be coated by a durable layer of material for forming a rubber coating over the molded inner cone after the fingers have been cut.

Although rubber and plastic are examples of materials which can be used to produce the adapter, metals may also be used. For example, rubber could be molded about metal rods. A rubber sheath could be used to cover an aluminum cone section and an aluminum open-end member.

The FIG. 4 embodiment of an adapter 20 is shown in a partial cutaway and exploded view. Tube 19 for supplying oxygen or another fluid to the adapter is also shown. The tube is threaded for mating with sleeve 21 of the adapter.

Sleeve 21 is formed with slot 22 for snapping the sleeve into engagement with cone section 23 of the adapter. Sleeve 21 includes threaded inner channel 24 for mating with the threaded end 25 of tube 19. In effect, the sleeve forms the base of the adapter.

The cone section 23 is comprised of a plurality of fingers 26 which fit together as an integral unit. The ends of the fingers 26 are slanted inwardly as shown in one embodiment of FIG. 3 for interconnecting with the slot 22 in sleeve 21.

The cone section is covered by inflatable and cone-shaped sheath 27. The sheath may be comprised of an elastic material such as rubber. The sheath includes an end flap 28 that covers the exposed part of the sleeve 21 when the sleeve and cone sections are assembled as shown in FIG. 5.

Pump 29 is shown inserted into the sheath 27 through a valve (not clearly shown) at the outer layer of the sheath. The pump may be a hand-operated type such as is commonly used in pumping air into footballs, basketballs, etc. In other embodiments, automatic pumps may be used. The exact type of pump used to force air into the sheath is a matter to be determined by the particular circumstances of an operation and the availability of equipment.

The valve may also be the type of valve used in footballs, basketballs, etc. Other valves within the knowledge of persons skilled in the art may also be used. The sheath may be deflated by inserting a hollow tube into the valve to vent the air to the atmosphere.

FIG. 5 is a cross-sectional view of the FIG. 4 embodiment showing the inflatable sheath 27 in greater detail. The sheath is shown partially inflated. Pump 29 is shown inserted through valve 30 in the outer layer 31 of the sheath.

The inner connection of cone section 23 with sleeve 21 is also illustrated. The tube 19 is shown engaged in the threaded channel 24 of the sleeve. The tip of the tube is shown in contact with the face of lever 32.

The tip of the cone section is inserted into a tube 33 which is being adapted to tube 19 by adapter 20. Tube 19 is threaded into sleeve 21 until the cone section is secured within tube 33. At that time, in order to form a more complete seal, the sheath 27 is inflated. As a result, the adapter is more tightly engaged within the tube 33 and the possibility of leakage from around the engaged surfaces is reduced to a minimum.

FIG. 6 shows one application of the adapter which is shown in FIG. 1. The FIG. 4 adapter could just as easily have been shown. The adapter 1 is used to adapt the diameter of tube 40 to the tracheotomy tube 41 in trachea 42. Oxygen for the patient is provided by a respirator or ventilator into tube 43. The oxygen passes through nebulizer 44 and is directed by valve 45 into tube 40. When the patient exhales, the valve switches the air out the exhaust port 46 of the valve 45.

In operation, tube 41 is inserted into a trachea. The tip of the adjustable adapter 1 is inserted into the open end of tube 41. The threaded end of tube 40 is engaged within the threaded open end, or base, of adapter 1 for expanding the fingers of the adapter 1. The tube 40 is rotated until the fingers are expanded and the adapter 1 securely engaged within tube 41. At that time, the remaining parts of tube 40 are connected on the other open end of tube 40 and are connected to valve 45. Oxygen can then be supplied to the patient through the assembly.

At the end of the operation, the flexible part of tube 40 is disconnected. The threaded end is then rotated in the opposite direction from the original rotation for causing the fingers of adapter 1 to be unflexed. When the diameter of the fingers has been reduced sufficiently, the adapter is removed from the tube 41. Tube 41 may then be removed from the throat.

I claim:

1. An adjustable adapter for tubes comprising,
a cone section including a plurality of circumferentially disposed and flexible fingers forming said cone section a base section connected to said cone section and including means for engaging a tube, and lever means connected to said fingers and enclosed within said cone section, said lever means including means actuated by the engagement of a tube within said base means, said means actuated comprising a wall means on said lever means and extending substantially normal to the axis of said tube and with an inner diameter smaller than the outer diameter of said tube such that upon axial movement of said tube within said base means the end wall of said tube engages said wall means to move it axially and flex the fingers attached thereto outwardly.

2. The combination recited in claim 1 wherein said adjustable adapter further comprises means for preventing leakage from between said fingers when the fingers are in their flexed position.

3. The combination recited in claim 2 wherein said means for preventing leakage comprises an elastic sheath which fits at least over the fingers.

4. The combination recited in claim 3 wherein said lever means is circumferentially disposed about the inner circumference of said cone section, including a face portion contactable by the end of said tube for urging said fingers into a desired flexed position.

5. An adjustable adapter for tubes comprising a cone section including a plurality of circumferentially disposed and flexible fingers forming said cone section a base section connected to said cone section and including means for engaging a tube, an inflatable elastic sheath which fits at least over said fingers when the fingers are in their flexed position, said sheath including a valve for permitting a fluid to inflate the sheath and for permitting the fluid to be exhausted for deflating the sheath.

6. The combination recited in claim 1 wherein said base section includes a slot about the outer circumference thereof, and said cone section defines an opening away from said flexible fingers which mates with said slot for connecting said base section and said cone section.

7. The combination recited in claim 6 wherein said cone section and base section comprise an integral part.

8. The combination recited in claim 1 wherein said circumferentially disposed and flexible fingers forming said cone section are separate portions connected together by an elastic layer, said separate portions being actuable by the engagement of a tube in the base section for forcing the cone section to expand to said desired diameter.

* * * * *